United States Patent
Wang et al.

(10) Patent No.: US 11,631,873 B1
(45) Date of Patent: Apr. 18, 2023

(54) METHOD FOR CONTROLLING A FUEL CELL SYSTEM HAVING A HYDROGEN FUEL INJECTOR/EJECTOR

(71) Applicant: GM GLOBAL TECHNOLOGY OPERATIONS LLC, Detroit, MI (US)

(72) Inventors: Xiaofeng Wang, Troy, MI (US); Manish Sinha, Rochester Hills, MI (US); Chad Dubois, Oxford, MI (US); Sergio E. Garcia, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/524,037

(22) Filed: Nov. 11, 2021

(51) Int. Cl.
  *H01M 8/04* (2016.01)
  *H01M 8/04746* (2016.01)
  *H01M 8/04082* (2016.01)
  *H01M 8/04089* (2016.01)

(52) U.S. Cl.
  CPC ... *H01M 8/04753* (2013.01); *H01M 8/04089* (2013.01); *H01M 8/04201* (2013.01)

(58) Field of Classification Search
  CPC ......... H01M 8/04753; H01M 8/04089; H01M 8/04201
  See application file for complete search history.

(56) References Cited

U.S. PATENT DOCUMENTS

| | | | |
|---|---|---|---|
| 7,320,840 B2 | 1/2008 | Pechtold et al. | |
| 8,409,762 B2 | 4/2013 | Frost et al. | |
| 2008/0141760 A1* | 6/2008 | Sienkowski | H01M 8/04679 73/40.5 R |

* cited by examiner

*Primary Examiner* — Olatunji A Godo
(74) *Attorney, Agent, or Firm* — Quinn IP Law

(57) ABSTRACT

A method for controlling a fuel cell system having a hydrogen fuel injector/ejector and a control system, includes determining a hydrogen fuel consumption rate associated with a selected power level at steady state, determining a modeled hydrogen fuel flow rate associated with the selected power level and the injector/ejector, determining a modeled effective flow area associated with the injector/ejector, determining a true effective flow area of the injector/ejector, and using the effective flow area to calculate or adjust a command signal, an estimation or an estimation error of at least one of a hydrogen fuel flow rate, an anode leak rate and an anode exhaust valve flow rate.

20 Claims, 2 Drawing Sheets

METHOD FOR CONTROLLING A FUEL CELL SYSTEM HAVING A HYDROGEN FUEL INJECTOR/EJECTOR

INTRODUCTION

This disclosure relates generally to methods for operating and controlling a fuel cell system having a hydrogen fuel injector/ejector.

Fuel cell systems operate by converting hydrogen and oxygen into water and electricity, utilizing an anode and a cathode which are disposed in electrochemical communication with each other.

An injector, an ejector or a combined injector/ejector is used to introduce hydrogen gas into the anode at a metered rate in response to a control signal sent to the injector/ejector. However, the effective orifice area of the injector/ejector may vary over time and from part to part, which may cause undesirable variations in the performance of the fuel cell system.

SUMMARY

According to one embodiment, a method is provided for controlling a fuel cell system having a hydrogen fuel injector/ejector and a control system. In this embodiment, the method includes: determining a hydrogen fuel consumption rate $\dot{n}_{TrsntConsum}$ associated with a selected power level at steady state; obtaining a modeled hydrogen fuel flow rate $\dot{n}_{injSp\_Model}$ associated with the selected power level and the injector/ejector; estimating a true effective flow area $A_{Eff\_Model}$ of the injector/ejector, wherein $A_{Eff\_True} = A_{Eff\_Model} \cdot (\dot{n}_{TrsntConsum}/\dot{n}_{injSp\_Model})$ and $A_{Eff\_Model}$ is a modeled effective flow area associated with the injector/ejector; and using the effective flow area $A_{Eff\_True}$ to calculate or adjust a command signal, an estimation or an estimation error of at least one of a hydrogen fuel flow rate, an anode leak rate and an anode exhaust valve flow rate.

At the selected power level at steady state, an anode pressure may be maintained at a constant pressure. The modeled hydrogen fuel flow rate $\dot{n}_{injSp\_Model}$ may be obtained from a first look-up table associated with the control system or may be calculated by the control system. Similarly, the modeled effective flow area $A_{Eff\_Model}$ may be obtained from a second look-up table associated with the control system or may be calculated by the control system. The method may further include operating the fuel cell system at the selected power level and at steady state, in order to determine the hydrogen fuel consumption rate $\dot{n}_{TrsntConsum}$ associated with the selected power level at steady state.

The fuel cell system may include a proportional-integral-adaptive (PIA) controller operatively associated with the injector/ejector. Additionally, the true effective flow area $A_{Eff\_True}$ may be estimated using $A_{Eff\_True} = A_{geo} \cdot \text{Coeff}_{DC} \cdot (1+a^{new})$, where $a^{new} = F_x \cdot \dot{n}_{TrsntConsum}/(\dot{n}_{TrsntConsum} + \dot{n}_{Leak\_Model}) - 1$ and $F_x \approx 1 + I_A \cdot \int e\, dt + p_A \cdot e + a^{old}$. In these equations, $A_{geo}$ is an orifice area of the injector/ejector that is determinable at a calibration event, $\text{Coeff}_{DC}$ is an orifice discharge coefficient of the injector/ejector that is determinable at the calibration event, $a^{new}$ is an updated adaption term, $F_x$ is an injector/ejector flow adjustment factor output from the PIA controller, $\dot{n}_{Leak\_Model}$ is an anode leak rate calculated by $\dot{n}_{Leak\_Model} = \dot{n}_{injSp\_Model} - \dot{n}_{TrsntConsum}$, $I_A$ is an integral gain of the PIA controller, $p_A$ is a proportional gain of the PIA controller, e is an error of the PIA controller modeled by $\dot{n}_{Leak\_Model} - \dot{n}_{TrsntConsum}$, $\int e\, dt$ is a time integral of the error e, and $a^{old}$ is a previous adaption term stored in a non-volatile memory associated with the control system.

The method may further include storing the updated adaption term $a^{new}$ in the non-volatile memory, or it may include replacing the previous adaption term $a^{old}$ stored in the non-volatile memory with the updated adaption term $a^{new}$. Additionally, the anode leak rate $\dot{n}_{Leak\_Model}$ may be an averaged anode leak rate stored in the non-volatile memory.

According to another embodiment, a method of operating a fuel cell system having a hydrogen fuel injector/ejector, an anode, a proportional-integral-adaptive (PIA) controller operatively associated with the injector/ejector, a control system and a non-volatile memory associated with the control system includes: (i) operating the fuel cell system at a power level for a predetermined time; (ii) determining a hydrogen fuel consumption rate $\dot{n}_{TrsntConsum}$ associated with the power level; (iii) obtaining a modeled hydrogen fuel flow rate $\dot{n}_{injSp\_Model}$ associated with the selected power level and the injector/ejector; (iv) finding an anode leak rate $\dot{n}_{Leak\_Model}$ of the anode, where $\dot{n}_{Leak\_Model} = \dot{n}_{injSp\_Model} - \dot{n}_{TrsntConsum}$; and (v) calculating an adaption term $a^{new}$, where $a^{new} = (1 + I_A \cdot \int e\, dt + p_A \cdot e + a^{old}) \cdot \dot{n}_{TrsntConsum}/(\dot{n}_{TrsntConsum} + \dot{n}_{Leak\_Model}) - 1$, in which $I_A$ is an integral gain of the PIA controller, $p_A$ is a proportional gain of the PIA controller, e is an error of the PIA controller modeled by $\dot{n}_{injSp\_Model} - \dot{n}_{TrsntConsum}$, $\int e\, dt$ is a time integral of the error e, and $a^{old}$ is a previously calculated or provided adaption term stored in the non-volatile memory.

The method may further include storing the calculated adaption term $a^{new}$ in the non-volatile memory. Alternatively, the method may include comparing the calculated adaption term $a^{new}$ with the previously calculated or provided adaption term $a^{old}$, and replacing the previously calculated or provided adaption term $a^{old}$ in the non-volatile memory with the calculated adaption term $a^{new}$ if the difference between the adaption terms $a^{old}$ and $a^{new}$ is greater than a predetermined value. The method may further include storing the anode leak rate $\dot{n}_{Leak\_Model}$ in the non-volatile memory.

The embodiment above may further include repeating the operating, determining, obtaining, finding and calculating steps for a plurality of times for different power levels from the initial power level. In each repeat of the calculating step, the respective calculated adaption term $a^{new}$ may be stored in the non-volatile memory as either (i) a replacement for a previously calculated adaption term or (ii) an average and/or accumulation of some or all of the previous adaption terms. The method may also include estimating a true effective flow area $A_{Eff\_True}$ of the injector/ejector, using one of $A_{Eff\_True} = A_{Eff\_Model} \cdot (\dot{n}_{TrsntConsum}/\dot{n}_{injSp\_Model})$ and $A_{Eff\_True} = A_{geo} \cdot \text{Coeff}_{DC} \cdot (1+a^{new})$, in which $A_{Eff\_Model}$ is a modeled effective flow area associated with the injector/ejector, $A_{geo}$ is an orifice area of the injector/ejector and $\text{Coeff}_{DC}$ is an orifice discharge coefficient of the injector/ejector, and using the effective flow area $A_{Eff\_True}$ to calculate or adjust a command signal, an estimation or an estimation error of at least one of a hydrogen fuel flow rate, an anode leak rate and the anode exhaust valve flow rate. At the selected power level at steady state, an anode pressure may be maintained at a constant pressure. Each of the modeled hydrogen fuel flow rate $\dot{n}_{injSp\_Model}$ and the modeled effective flow area $A_{Eff\_Model}$ may be obtained from a look-up table associated with the control system or may be calculated by the control system.

According to yet another embodiment, a method of operating a fuel cell system having a hydrogen fuel injector/ejector, an anode, a proportional-integral-adaptive (PIA)

controller operatively associated with the injector/ejector, a control system and a non-volatile memory associated with the control system, includes: (i) operating the fuel cell system at a power level for a predetermined time; (ii) determining a hydrogen fuel consumption rate $\dot{n}_{TrsntConsum}$ associated with the power level; (iii) obtaining a modeled hydrogen fuel flow rate $\dot{n}_{injSp\_Model}$ associated with the selected power level and the injector/ejector; (iv) finding an anode leak rate $\dot{n}_{Leak\_Model}$ of the anode, where $\dot{n}_{Leak\_Model} = \dot{n}_{injSp\_Model} - \dot{n}_{TrsntConsum}$; (v) calculating an adaption term $a^{new}$, where $a^{new} = (1 + I_A \cdot \int e \, dt + p_A \cdot e + a^{old}) \cdot \dot{n}_{TrsntConsum} / (\dot{n}_{TrsntConsum} + \dot{n}_{Leak\_Mode}) - 1$, in which $I_A$ is an integral gain of the PIA controller, $p_A$ is a proportional gain of the PIA controller, e is an error of the PIA controller modeled by $\dot{n}_{injSp\_Model} - \dot{n}_{TrsntConsum}$, $\int e \, dt$ is a time integral of the error e, and $a^{old}$ is a previously calculated or provided adaption term stored in the non-volatile memory; (vi) comparing the calculated adaption term $a^{new}$ with the previously calculated or provided adaption term $a^{old}$; (vii) replacing the previously calculated or provided adaption term $a^{old}$ in the non-volatile memory with the calculated adaption term $a^{new}$ if the difference between the adaption terms $a^{old}$ and $a^{new}$ is greater than a predetermined value; (viii) repeating the operating, determining, obtaining, finding, calculating, comparing and replacing steps (i.e., (i) through (vii)) for a plurality of times for different power levels from the initial power level; (ix) estimating a true effective flow area $A_{Eff\_True}$ of the injector/ejector, using one of $A_{Eff\_True} = A_{Eff\_Model} \cdot (\dot{n}_{TrsntConsum} / \dot{n}_{injSp\_Model})$ and $A_{Eff\_True} = A_{geo} \cdot \text{Coeff}_{DC} (1 + a^{new})$ in which $A_{Eff\_Model}$ is a modeled effective flow area associated with the injector/ejector, $A_{geo}$ is an orifice area of the injector/ejector and $\text{Coeff}_{DC}$ is an orifice discharge coefficient of the injector/ejector; and (x) using the effective flow area $A_{Eff\_True}$ to calculate or adjust a command signal, an estimation or an estimation error of at least one of a hydrogen fuel flow rate, an anode leak rate and the anode exhaust valve flow rate.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
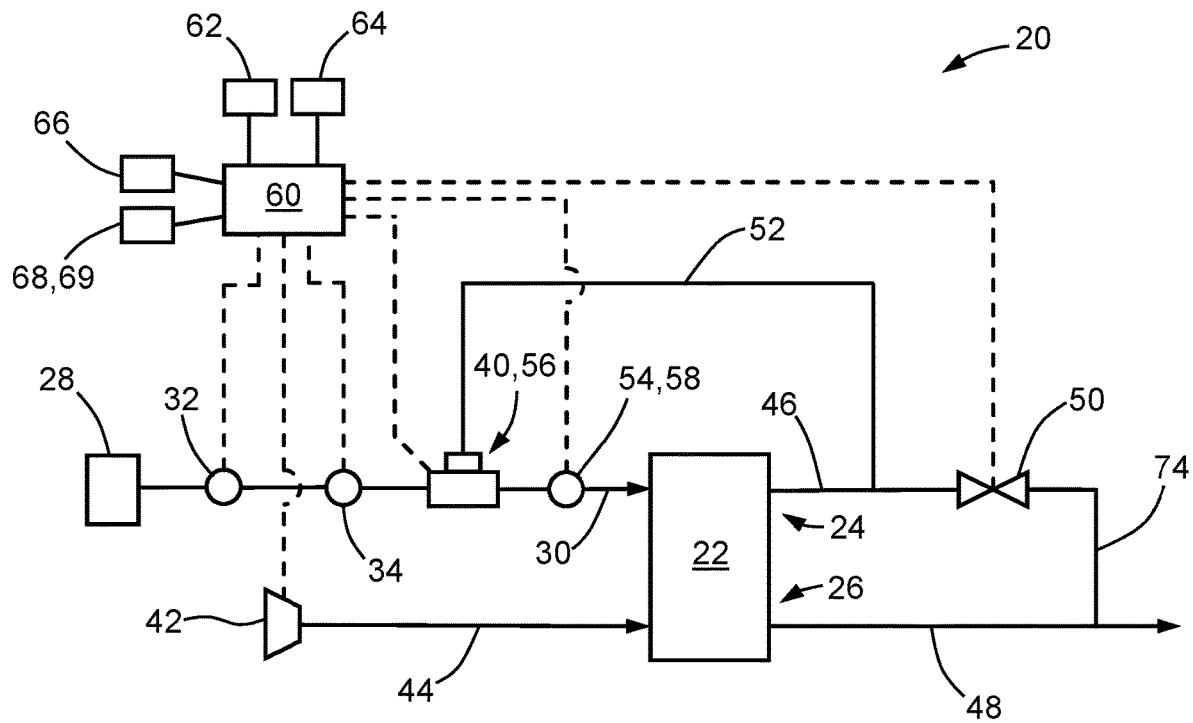
FIG. 1 is a schematic view of a fuel cell system.

Referring now to the drawings, wherein like numerals indicate like parts in the several views, a fuel cell system 20 and a method 100 for operating or controlling the fuel cell system 20 are shown and described herein.

The present disclosure describes a methodology for estimating an effective flow area of the injector/ejector 40, referred to herein as a true effective flow area $A_{Eff\_True}$, which may be used to overcome injector/ejector flow rate estimation errors and inaccuracies. The methodology provides fast adaption to fix injector/ejector flow rate error by addressing the flow area variation which can occur due to part-to-part size variations (e.g., due to manufacturing tolerances) and size/flow variations which may arise over the life of a given injector/ejector 40. Effectively addressing this variation as described herein provides a "correction factor" which can be used to correct or adjust a command signal, an estimation or an estimation error of the hydrogen fuel flow rate 70, the anode leak rate 72 and/or the anode exhaust valve flow rate 74, all of which are affected by injector/ejector flow rate, and thus are also affected by variations in the effective flow area of the injector/ejector 40 over time.

Figure 2:
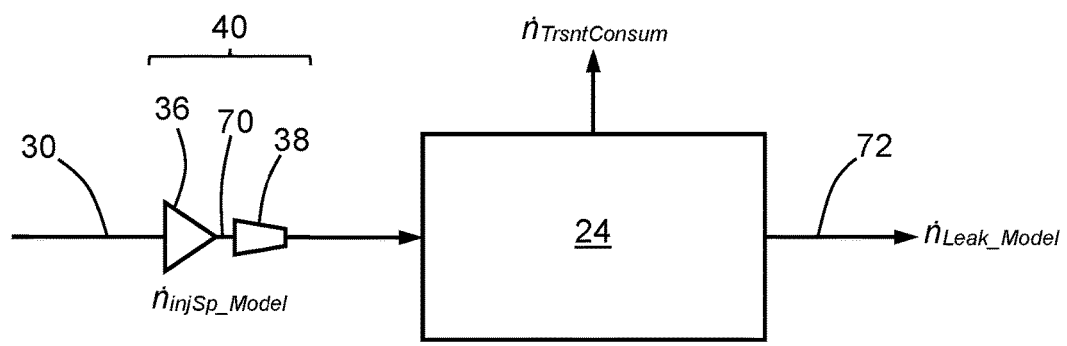
FIG. 2 is a schematic view of an anode for a fuel cell system.

FIGS. 1 and 2 show schematic views of a fuel cell system 20 and an anode 24 for a fuel cell system 20, respectively. The fuel cell system 20 may be operated at one or more power levels, and includes a fuel cell stack 22 which has an anode 24 and a cathode 26. Hydrogen gas is fed from a hydrogen source 28 to the anode 24 via an anode input line 30, and oxygen or air is fed from a compressor 42 or other oxygen/air source to the cathode 26 via a cathode input line 44. The anode input line 30 includes a temperature sensor 32 or a modeled temperature, an injection inlet pressure sensor 34, an injector/ejector 40, an anode pressure sensor 54, and a proportional-integral (PI) controller 58 operatively associated with the anode pressure sensor 54. As shown in FIG. 2, the injector/ejector 40 may include an injector or injector portion 36 and an ejector or ejector portion 38. As used herein, an "injector/ejector" 40 may be an injector 36, or an ejector 38, or both an injector 36 and an ejector 38. In cases where the injector/ejector 40 includes both an injector 36 and an ejector 38, these two components may be combined into a single unified structure, or they may be disposed as two separate structures that are disposed in series with each other. The injector/ejector 40 may also include or be operatively associated with a proportional-integral-adaptive (PIA) controller 56, which may be used to control and/or monitor the flow of hydrogen gas through the injector/ejector 40.

An anode exhaust line 46 extends from an exit of the anode 24, and a cathode exhaust line 48 extends from an exit of the cathode 26. The anode exhaust line 46 may carry unused hydrogen gas away from the anode 24, and the cathode exhaust line 48 may carry unused oxygen/air away from the cathode 26. In either or both of the exhaust lines 46, 48, water and other liquids or gases may be carried away from the fuel cell stack 22. An anode exhaust valve 50 may be disposed in the anode exhaust line 46, with the portion of the anode exhaust line 46 that is downstream of the anode exhaust valve 50 being joined with the cathode exhaust line 48 and having an anode exhaust valve flow rate 74.

A recirculation line 52 runs from a first end, which is connected with a portion of the anode exhaust line 46 upstream of the anode exhaust valve 50, to a second end, which is connected with the injector/ejector 40. In this arrangement, some or all of the unused hydrogen gas which passes into the anode exhaust line 46 from the anode 24 may be directed back into the anode 24 via the recirculation line 52.

The fuel cell system 20 also includes a control system 60, which may include various control hardware 62 and control software 64, including non-volatile memory 66 and one or more look-up tables 68, 69. The control system 60 may be connected with various sensors, actuators and other devices within the fuel cell system 20, such as the temperature sensor 32, the pressure sensors 34, 54, the anode exhaust valve 50, the PIA controller 56, the PI controller 58, the compressor/oxygen source 42 and the injector/ejector 40.

As shown in FIG. 2, a flow of hydrogen gas is passed from the injector/ejector 40 and into the anode 24 at a hydrogen fuel flow rate 70, which can be modeled by the control system 60 (e.g., within the control software 64) as a modeled hydrogen fuel flow rate $\dot{n}_{injSp\_Model}$. Most of the hydrogen gas gets electrochemically reacted with oxygen in the fuel cell stack 22 (i.e., consumed) to produce electricity and water. This majority of the hydrogen gas that gets consumed and converted into electricity is represented by $\dot{n}_{TrsntConsum}$. However, some small portion of the hydrogen gas may leak out of the anode 24 (e.g., through seals, gaskets, fittings, etc.); this small portion is represented by $\dot{n}_{Leak\_Model}$, having an anode leak rate 72. Using a mass-balance approach on the gas inputs and outputs of the anode 24 provides the following mass-balance equation:

$$\dot{n}_{Leak\_Model} = \dot{n}_{injSp\_Model} - \dot{n}_{TrsntConsum} \qquad \text{(Eqn. 1)}$$

The injector/ejector 40 may be operated in range or duty cycle from 0% (with the injector/ejector 40 fully closed and no hydrogen gas flowing therethrough) to 100% (with the injector/ejector 40 fully open). At any given injector/ejector duty cycle (DC), the following equation may be used:

$$DC = (\dot{n}_{injSp\_True}/\dot{n}_{injMax\_True}) = (\dot{n}_{injSp\_Model}/\dot{n}_{injMax\_Model}) \qquad \text{(Eqn. 2)}$$

where $\dot{n}_{injSp\_True}$ is an actual hydrogen fuel flow rate for the given duty cycle, $\dot{n}_{injMax\_True}$ is an actual maximum hydrogen fuel flow rate for a 100%/fully open duty cycle, $\dot{n}_{injSp\_Model}$ is a modeled hydrogen fuel flow rate for the given duty cycle as modeled in the control software 64, and $\dot{n}_{injMax\_Model}$ is a modeled maximum hydrogen fuel flow rate for a 100%/fully open duty cycle as modeled in the control software 64. This equation (i.e., Eqn. 2) can be rearranged to provide the following:

$$(\dot{n}_{injSp\_True}/\dot{n}_{injSp\_Model}) = (\dot{n}_{injMax\_True}/\dot{n}_{injMax\_Model}) \qquad \text{(Eqn. 3)}$$

Looking at the right-hand side of Eqn. 3, where both quantities are expressions of a 100%/fully open duty cycle, along with the fact that injector/ejector flow rate is proportional to the injector/ejector orifice effective flow area and considering temperature and gas species (both are hydrogen) are the same, it may be determined that:

$$(\dot{n}_{injMax\_True}/\dot{n}_{injMax\_Model}) = (A_{Eff\_True}/A_{Eff\_Model}) \qquad \text{(Eqn. 4)}$$

where $A_{Eff\_True}$ is the actual injector/ejector orifice effective flow area and $A_{Eff\_Model}$ is the modeled injector/ejector orifice effective flow area as modeled in the control software 64. Then, combining Eqns. 3 and 4 yields:

$$(\dot{n}_{injSp\_True}/\dot{n}_{injSp\_Model}) = (\dot{n}_{injMax\_True}/\dot{n}_{injMax\_Model}) = (A_{Eff\_True}/A_{Eff\_Model}) \qquad \text{(Eqn. 5)}$$

or more simply:

$$(\dot{n}_{injSp\_True}/\dot{n}_{injSp\_Model}) = (A_{Eff\_True}/A_{Eff\_Model}) \qquad \text{(Eqn. 6)}$$

When the fuel cell system 20 is running at steady state, the actual anode gas leakage within a well-designed system should be negligible or very close to zero and all of the hydrogen gas entering the anode 24 can be assumed to be converted to electricity, yielding:

$$\dot{n}_{injSp\_True} = \dot{n}_{TrsntConsum} \qquad \text{(Eqn. 7)}$$

Substituting Eqn. 7 into Eqn. 6 for $\dot{n}_{injSp\_True}$ yields:

$$(\dot{n}_{TrsntConsum}/\dot{n}_{injSp\_Model}) = (A_{Eff\_True}/A_{Eff\_Model}) \qquad \text{(Eqn. 8)}$$

which can be rearranged as:

$$A_{Eff\_True} = A_{Eff\_Model} \cdot (\dot{n}_{TrsntConsum}/\dot{n}_{injSp\_Model}) \qquad \text{(Eqn. 9)}$$

Thus, the actual injector/ejector orifice effective flow area $A_{Eff\_True}$ for the injector/ejector 40 can be found from (i) the modeled injector/ejector orifice effective flow area as modeled in the control software 64 (i.e., $A_{Eff\_Model}$), (ii) the rate that hydrogen gas that gets consumed and converted into electricity (i.e., $\dot{n}_{TrsntConsum}$), and (iii) the modeled hydrogen fuel flow rate for the given duty cycle as modeled in the control software 64 (i.e., $\dot{n}_{injSp\_Model}$).

One approach for modeling the injector/ejector effective flow area (i.e., $A_{Eff\_Model}$) in the control software 64 is by using the following expression:

$$A_{Eff\_Model} = A_{geo} \cdot \text{Coeff}_{DC} \cdot F_x \qquad \text{(Eqn. 10)}$$

where $A_{geo}$ is an orifice area of the injector/ejector 40 that is determinable at a calibration event, $\text{Coeff}_{DC}$ is an orifice discharge coefficient of the injector/ejector 40 that is determinable at the calibration event, and $F_x$ is an injector/ejector flow adjustment factor output by or derivable from the PIA controller 56. (The aforementioned calibration event may occur at the end of production before the fuel cell system 20 is put into production, and/or at some later point after the injector/ejector 40 has been serviced or replaced.) The flow adjustment factor $F_x$ may be approximated as:

$$F_x \approx I_A \int e\, dt + p_A \cdot e + a^{old} \qquad \text{(Eqn. 11)}$$

where, $I_A$ is an integral gain of the PIA controller 56, $p_A$ is a proportional gain of the PIA controller 56, e is an error of the PIA controller 56 modeled by $\dot{n}_{injSp\_Model} - \dot{n}_{TrsntConsum}$, $\int e\, dt$ is a time integral of the error e, and $a^{old}$ is a previous adaption term stored in non-volatile memory 66. (For example, the $a^{old}$ term may be an initial value that is stored in a look-up table 68, 69. Optionally, multiple values for $a^{old}$ may be stored in one or more look-up tables 68, 69, where each value is associated with a respective power level of the fuel cell system 20.)

However, Eqn. 11 is known to be an approach that is relatively "slow" at arriving at a satisfactory solution, so an improved alternative approach would be to utilize a relatively "faster" flow adjustment factor or adaption term. For example, the $(\dot{n}_{TrsntConsum}/\dot{n}_{injSp\_Model})$ portion from Eqn. 9 may be adjoined to Eqn. 10 to produce:

$$A_{Eff\_True} = A_{geo} \cdot \text{Coeff}_{DC} \cdot F_x \cdot (\dot{n}_{TrsntConsum}/\dot{n}_{injSp\_Model}) \qquad \text{(Eqn. 12)}$$

where $F_x \cdot (\dot{n}_{TrsntConsum}/\dot{n}_{injSp\_Model})$ may be considered as a candidate for a newer and "faster" flow adjustment factor. In turn, this newer and "faster" flow adjustment factor may be expressed as the term $(1+a^{new})$, where $a^{new}$ is an updated adaption term, thus yielding:

$$F_x \cdot (\dot{n}_{TrsntConsum}/\dot{n}_{injSp\_Model}) = (1+a^{new}) \qquad \text{(Eqn. 13)}$$

and $$A_{Eff\_True} = A_{geo} \cdot \text{Coeff}_{DC} \cdot (1+a^{new}) \qquad \text{(Eqn. 14)}$$

Rearranging Eqn. 13 so as to isolate the updated adaption term $a^{new}$ yields:

$$a^{new} = F_x \cdot (\dot{n}_{TrsntConsum}/\dot{n}_{injSp\_Model}) - 1 \qquad \text{(Eqn. 15)}$$

This new or updated adaption term $a^{new}$ may be stored in non-volatile memory 66 so as to replace the previous adaption term $a^{old}$. Additionally, when further calculations are made for $a^{new}$, these may be stored to replace previous calculations of the adaption term.

In the control system 60 (e.g., in the control software 64), the modeled hydrogen fuel flow rate set point $\dot{n}_{injSp\_Model}$ may be calculated in association with the anode pressure proportional-integral (PI) controller 58, expressed as:

$$\dot{n}_{injSp\_Model} = \dot{n}_{TrsntConsum} + I_p \int e\, dt + p_p \cdot e \qquad \text{(Eqn. 16)}$$

where $I_p$ is an integral gain of the anode pressure PI controller 58, e is an error of the anode pressure PI controller 58 between pressure setpoint and feedback, $\int e\, dt$ is a time integral of the error e, and $p_p$ is a proportional gain of the anode pressure PI controller 58. Substituting Eqn. 16 into Eqn. 15 yields:

$$a^{new}=F_x \cdot \dot{n}_{TrsntConsum}/(\dot{n}_{TrsntConsum}+I_p \cdot \int e\ dt+p_p \cdot e)-1 \quad \text{(Eqn. 17)}$$

As noted above in Eqn. 1 (and repeated below), the modeled anode leak rate $\dot{n}_{Leak\_Model}$ is calculated as the difference between the modeled hydrogen fuel flow rate $\dot{n}_{injSp\_Model}$ and the hydrogen gas consumption rate $\dot{n}_{TrsntConsum}$:

$$\dot{n}_{Leak\_Model}=\dot{n}_{injSp\_Model}-\dot{n}_{TrsntConsum} \quad \text{(Eqn. 1)}$$

Substituting the $\dot{n}_{injSp\_Model}$ expression from Eqn. 16 into Eqn. 1 then yields:

$$\dot{n}_{Leak\_Model}=(\dot{n}_{TrsntConsum}+I_p \cdot \int e\ dt+p_p \cdot e)-\dot{n}_{TrsntConsum}=\int e\ dt+p_p \cdot e \quad \text{(Eqn. 18)}$$

Then, substituting Eqn. 18 into Eqn. 17 yields:

$$a^{new}=F_x(\dot{n}_{TrsntConsum}/(\dot{n}_{TrsntConsum}+\dot{n}_{Leak\_Model}))-1 \quad \text{(Eqn. 19)}$$

With regard to Eqn. 19, it may be noted that the modeled anode leak rate $\dot{n}_{Leak\_Model}$ may be averaged and stored in non-volatile memory 66 for use in valve flow estimation and to improve calculation reliability which might otherwise be affected by local variations. Also, the hydrogen fuel consumption rate $\dot{n}_{TrsntConsum}$ may be determined by observing the power consumption of the fuel cell system 20, and the injector/ejector flow adjustment factor $F_x$ may be determined from the PIA controller 56. Thus, all of the terms on the right-hand side of Eqn. 19 should be readily available or determinable so that the adaption factor $a^{new}$ may be found. Once $a^{new}$ is determined, the injector/ejector orifice effective flow area $A_{Eff\_True}$ may be corrected/updated, such as by utilizing Eqn. 14. Additionally, the corrected/updated effective flow area $A_{Eff\_True}$ may also be used to calculate or adjust a command signal, an estimation or an estimation error of at least one of a hydrogen fuel flow rate 70, an anode leak rate 72 and an anode exhaust valve flow rate 74, as well as any other parameter of the fuel cell system 20 which depends upon (or may benefit from) $A_{Eff\_True}$ for its calculation or determination.

Figure 3:
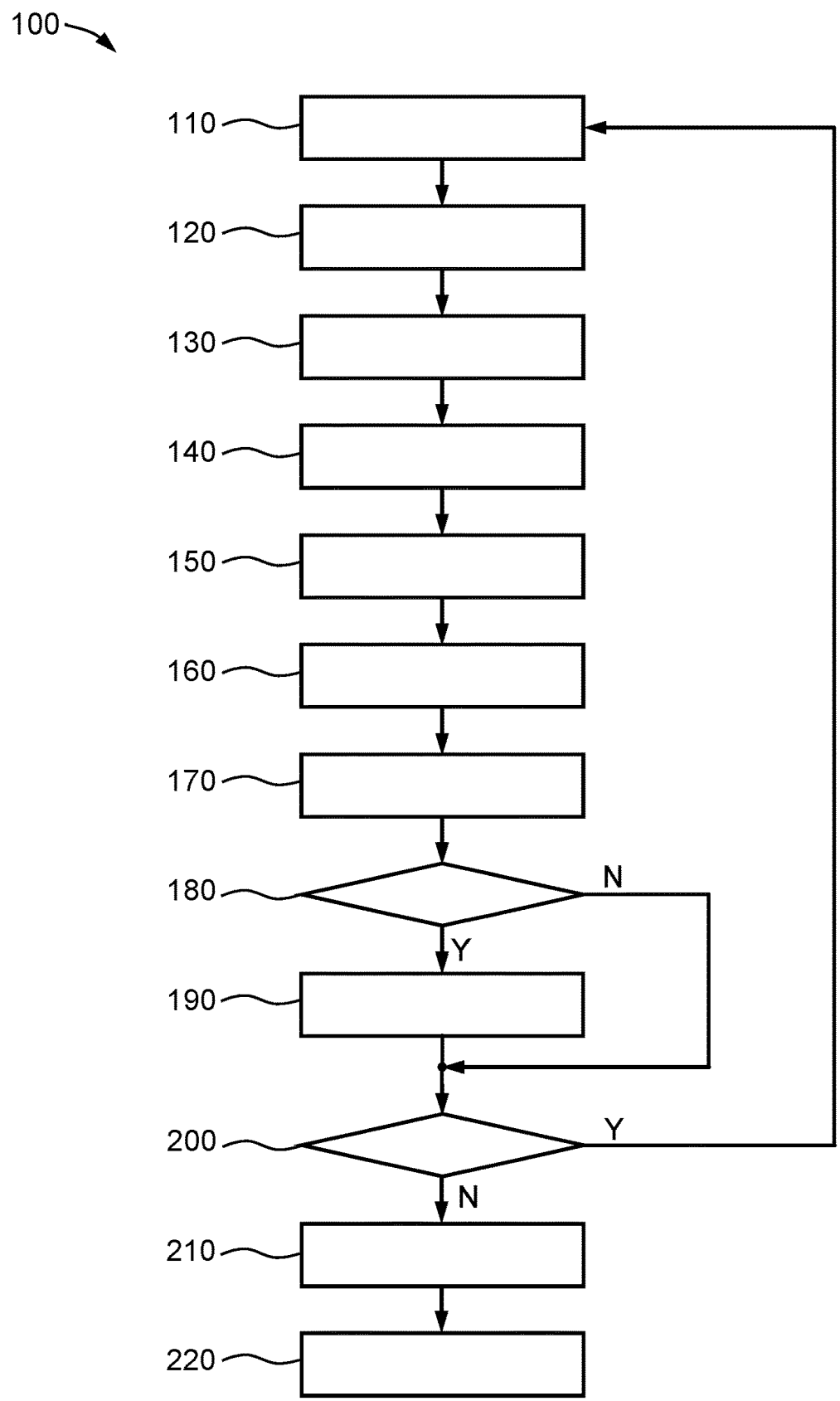
FIG. 3 is a flowchart for a method of controlling or operating a fuel cell system.

FIG. 3 shows a flowchart for a method 100 of controlling or operating the fuel cell system 20. It should be noted that multiple embodiments of the method 100 are disclosed herein, and that some of these embodiments may not utilize all of the steps shown in FIG. 3.

According to one embodiment, a method 100 is provided for controlling a fuel cell system 20 having a hydrogen fuel injector/ejector 40 and a control system 60. In this embodiment, the method 100 includes: at block 120, determining a hydrogen fuel consumption rate $\dot{n}_{TrsntConsum}$ associated with a selected power level at steady state; at block 130, obtaining a modeled hydrogen fuel flow rate $\dot{n}_{injSp\_Model}$ associated with the selected power level and the injector/ejector 40; at block 210, estimating a true effective flow area $A_{Eff\_True}$ of the injector/ejector, wherein $A_{Eff\_True}=A_{Eff\_Model} \cdot (\dot{n}_{TrsntConsum}/\dot{n}_{injSp\_Model})$ (i.e., Eqn. 9), and where $A_{Eff\_Model}$ is a modeled effective flow area associated with the injector/ejector 40; and, at block 220, using the effective flow area $A_{Eff\_True}$ to calculate or adjust a command signal, an estimation or an estimation error of at least one of a hydrogen fuel flow rate 70, an anode leak rate 72 and an anode exhaust valve flow rate 74.

At the selected power level at steady state, the anode pressure may be maintained at a constant pressure. (For example, the anode pressure may be the pressure measured by the pressure sensor 54 in the anode input line 30, or a pressure measured inside the anode 24 itself.) The modeled hydrogen fuel flow rate $\dot{n}_{injSp\_Model}$ that is obtained at block 130 may be obtained from a first look-up table 68 associated with the control system 60, or it may be calculated by the control system 60 (e.g., by the control software 64). Similarly, the modeled effective flow area $A_{Eff\_Model}$ may also be obtained at block 130 from a second look-up table 69 associated with the control system 60, or it may be calculated by the control system 60 (e.g., by the control software 64). (Note that this second look-up table 69 may be the same as the first look-up table 68, or it may be a different look-up table from the first look-up table 68.) The method 100 may further include, at block 110, operating the fuel cell system 20 at the selected power level and at steady state, in order to determine the hydrogen fuel consumption rate $\dot{n}_{TrsntConsum}$ associated with the selected power level at steady state.

The fuel cell system 100 may include a PIA controller 56 operatively associated with the injector/ejector 40. (Note that the PIA controller 56 may be used directly to control and/or monitor the hydrogen gas flow rate through the injector/ejector 40, and it may also be used indirectly for anode exhaust valve flow rate estimation and for slowly adapting the injector effective flow area $A_{Eff\_True}$, as described herein.) Additionally, the true effective flow area $A_{Eff\_True}$ may be estimated using the equation $A_{Eff\_True}=A_{geo} \cdot Coeff_{DC} \cdot (1+a^{new})$ (Eqn. 14), where $a^{new}=F_x \cdot \dot{n}_{TrsntConsum}/(\dot{n}_{TrsntConsum}+\dot{n}_{Leak\_Model})-1$ (i.e., Eqn. 19) and where $F_x \approx 1+I_A \cdot \int e\ dt+p_A \cdot e+a^{old}$ (i.e., Eqn. 11). That is, Eqn. 14, along with Eqns. 19 and 11, may be used instead of Eqn. 9 to estimate the true effective injector/ejector flow area $A_{Eff\_True}$. In the foregoing equations, $A_{geo}$ is an orifice area of the injector/ejector 40 that is determinable at a calibration event, $Coeff_{DC}$ is an orifice discharge coefficient of the injector/ejector 40 that is determinable at the calibration event, $a^{new}$ is an updated adaption term, $F_x$ is an injector/ejector flow adjustment factor output by or derivable from the PIA controller 56, $\dot{n}_{Leak\_Model}$ is an anode leak rate calculated by the mass-balance equation $\dot{n}_{Leak\_Model}=\dot{n}_{injSp\_Model}-\dot{n}_{TrsntConsum}$ (i.e., Eqn. 1), $I_A$ is an integral gain of the PIA controller 56, $p_A$ is a proportional gain of the PIA controller 56, e is an error of the PIA controller 56 modeled by $\dot{n}_{injSp\_Model}-\dot{n}_{TrsntConsum}$, $\int e\ dt$ is a time integral of the error e, and $a^{old}$ is a previous adaption term stored in a non-volatile memory 66 associated with the control system 60.

The method 100 may further include, at block 170, storing the updated adaption term $a^{new}$ in a non-volatile memory 66, or it may include, at block 180, replacing the previous adaption term $a^{old}$ stored in the non-volatile memory 66 with the updated adaption term $a^{new}$. Additionally, the anode leak rate $\dot{n}_{Leak\_Model}$ may be an averaged anode leak rate stored in the non-volatile memory 66.

According to another embodiment, a method 100 of operating a fuel cell system 20 having a hydrogen fuel injector/ejector 40, an anode 24, a PIA controller 56 operatively associated with the injector/ejector 40, a control system 60 and a non-volatile memory 66 associated with the control system 60 includes the following steps. At block 110, the fuel cell system 20 is operated at a selected power level for a predetermined time. At block 120, a hydrogen fuel consumption rate $\dot{n}_{TrsntConsum}$ associated with the power level is determined. At block 130, a modeled hydrogen fuel flow rate $\dot{n}_{injSp\_Model}$ associated with the selected power level and the injector/ejector 40 is obtained. At block 140, an anode leak rate $\dot{n}_{Leak\_Model}$ of the anode 24 is found, where $\dot{n}_{Leak\_Model}=\dot{n}_{injSp\_Model}-\dot{n}_{TrsntConsum}$. The modeled anode leak rate $\dot{n}_{Leak\_Model}$ may or may not be averaged values. And at block 160, an adaption term $a^{new}$ is calculated, where $a^{new}=(1+I_A \cdot \int e\ dt+p_a \cdot e+a^{old}) \cdot \dot{n}_{TrsntConsum}/(\dot{n}_{TrsntConsum}+$ $\dot{n}_{Leak\_Model}$)-1, in which $I_A$ is an integral gain of the PIA controller 56, $p_A$ is a proportional gain of the PIA controller 56, e is an error of the PIA controller 56, $\int e\ dt$ is a time integral of the error e, and $a^{old}$ is a previously calculated or provided adaption term stored in the non-volatile memory 66.

The method 100 may further include, at block 170, storing the calculated adaption term $a^{new}$ in the non-volatile memory 66. Alternatively, the method 100 may include, at block 180, comparing the calculated adaption term $a^{new}$ with the previously calculated or provided adaption term $a^{old}$, and, at block 190, replacing the previously calculated or provided adaption term $a^{old}$ in the non-volatile memory 66 with the calculated adaption term $a^{new}$ if the difference between the adaption terms $a^{old}$ and $a^{new}$ is greater than a predetermined value. The method 100 may further include, at block 150, storing the anode leak rate $\dot{n}_{Leak\_Model}$ in the non-volatile memory 66.

This embodiment above may further include, at block 200, repeating the operating, determining, obtaining, finding and calculating steps (i.e., blocks 110, 120, 130, 140 and 160) for a plurality of times for different power levels from the initial power level (e.g., until a minimum number of repetitions/power levels have been completed). In each repeat of the calculating step at block 160, the respective calculated adaption term $a^{new}$ for that iteration may be stored in non-volatile memory 66 as either (i) a replacement for a previously calculated adaption term or (ii) an average and/or an accumulation of some or all of the previous adaption terms. The method 100 may also include, at block 210, estimating a true effective flow area $A_{Eff\_True}$ of the injector/ejector, using either $A_{Eff\_True}=A_{Eff\_Model}\cdot(\dot{n}_{TrsntConsum}/\dot{n}_{injSp\_Model})$ (i.e., Eqn. 9) or $A_{Eff\_True}=A_{ego}\cdot Coeff_{DC}\cdot(1+a^{new})$ (Eqn. 14), in which $A_{Eff\_Model}$ is a modeled effective flow area associated with the injector/ejector 40, $A_{geo}$ is an orifice area of the injector/ejector 40 and $Coeff_{DC}$ is an orifice discharge coefficient of the injector/ejector 40, and, at block 220, using the effective flow area $A_{Eff\_True}$ to calculate or adjust a command signal, an estimation or an estimation error of at least one of the hydrogen fuel flow rate 70, the anode leak rate 72 and the anode exhaust valve flow rate 74. At each selected power level operating at steady state, the anode pressure may be maintained at a constant pressure. Each of the modeled hydrogen fuel flow rate $\dot{n}_{injSp\_Model}$ and the modeled effective flow area $A_{Eff\_Model}$ may be obtained from a look-up table 68, 69 associated with the control system 60, or they may be calculated by the control system 60.

According to yet another embodiment, a method 100 of operating a fuel cell system 20 having a hydrogen fuel injector/ejector 40, an anode 24, a PIA controller 56 operatively associated with the injector/ejector 40, a control system 60 and a non-volatile memory 66 associated with the control system 60, includes: at block 110, operating the fuel cell system 20 at a selected power level for a predetermined time; at block 120, determining a hydrogen fuel consumption rate $\dot{n}_{TrsntConsum}$ associated with the power level; at block 130, obtaining a modeled hydrogen fuel flow rate $\dot{n}_{injSp\_Model}$ associated with the selected power level and the injector/ejector 40; at block 140, finding an anode leak rate $\dot{n}_{Leak\_Model}$ of the anode 24, where $\dot{n}_{Leak\_Model}=\dot{n}_{injSp\_Model}-\dot{n}_{TrsntConsum}$; at block 160, calculating an adaption term $a^{new}$, where $a^{new}=(1+I_A\cdot\int e\ dt+p_A\cdot e+a^{old})\cdot\dot{n}_{TrsntConsum}/(\dot{n}_{TrsntConsum}+\dot{n}_{Leak\_Model})$-1, in which $I_A$ is an integral gain of the PIA controller, $p_A$ is a proportional gain of the PIA controller, e is an error of the PIA controller, $\int e\ dt$ is a time integral of the error e, and $a^{old}$ is a previously calculated or provided adaption term stored in the non-volatile memory; at block 180, comparing the calculated adaption term $a^{new}$ with the previously calculated or provided adaption term $a^{old}$, at block 190, replacing the previously calculated or provided adaption term $a^{old}$ in the non-volatile memory 66 with the calculated adaption term $a^{new}$ if the difference between the adaption terms $a^{old}$ and $a^{new}$ is greater than a predetermined value; at block 200, repeating the operating, determining, obtaining, finding, calculating, comparing and replacing steps (i.e., blocks 110-140, 160, 180 and 190) for a plurality of times for power levels that are different from the initial power level; at block 210, estimating a true effective flow area $A_{Eff\_True}$ of the injector/ejector 40, using either Eqn. 9 (i.e., $A_{Eff\_True}=A_{Eff\_Model}\cdot(\dot{n}_{TrsntConsum}/\dot{n}_{injSp\_Model})$) or Eqn. 14 (i.e., $A_{Eff\_True}=A_{geo}\cdot Coeff_{DC}\cdot(1+a^{new})$), where $A_{Eff\_Model}$ is a modeled effective flow area associated with the injector/ejector 40, $A_{geo}$ is an orifice area of the injector/ejector 40 and $Coeff_{DC}$ is an orifice discharge coefficient of the injector/ejector 40; and, at block 220, using the effective flow area $A_{Eff\_True}$ to calculate or adjust a command signal, an estimation or an estimation error of at least one of the hydrogen fuel flow rate 70, the anode leak rate 72 and the anode exhaust valve flow rate 74.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property.

The flowcharts and block diagrams in the drawings illustrate the architecture, functionality and/or operation of possible implementations of systems, methods and computer program products according to various embodiments of the present disclosure. In this regard, each block in the flowchart or block diagrams may represent a module, segment or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by hardware-based systems that perform the specified functions or acts, or combinations of hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the functions and/or actions specified in the flowcharts and block diagrams.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A method for controlling a fuel cell system having a hydrogen fuel injector/ejector and a control system, comprising:
    determining a hydrogen fuel consumption rate $\dot{n}_{TrsntConsum}$ associated with a selected power level at steady state;
    obtaining a modeled hydrogen fuel flow rate $\dot{n}_{injSp\_Model}$ associated with the selected power level and the injector/ejector;
    estimating a true effective flow area $A_{Eff\_True}$ of the injector/ejector, wherein $A_{Eff\_True}=A_{Eff\_Model}$ ($\dot{n}_{TrsntConsum}/\dot{n}_{injSp\_Model}$) and $A_{Eff\_Model}$ is a modeled effective flow area associated with the injector/ejector; and
    using the effective flow area $A_{Eff\_True}$ to calculate or adjust a command signal, an estimation or an estimation error of at least one of a hydrogen fuel flow rate, an anode leak rate and an anode exhaust valve flow rate.

2. The method of claim 1, wherein at the selected power level at steady state, an anode pressure is maintained at a constant pressure.

3. The method of claim 1, wherein the modeled hydrogen fuel flow rate $\dot{n}_{injSp\_Model}$ is obtained from a first look-up table associated with the control system or is calculated by the control system.

4. The method of claim 1, wherein the modeled effective flow area $A_{Eff\_Model}$ is obtained from a second look-up table associated with the control system or is calculated by the control system.

5. The method of claim 1, further comprising:
    operating the fuel cell system at the selected power level and at steady state, in order to determine the hydrogen fuel consumption rate $\dot{n}_{TrsntConsum}$ associated with the selected power level at steady state.

6. The method of claim 1, wherein the fuel cell system includes a proportional-integral-adaptive (PIA) controller operatively associated with the injector/ejector.

7. The method of claim 6, wherein the true effective flow area $A_{Eff\_True}$ is estimated using $A_{Eff\_True}=A_{geo}\cdot\text{Coeff}_{DC}\cdot(1+a^{new})$, where $a^{new}=F_x\cdot\dot{n}_{TrsntConsum}/\dot{n}_{TrsntConsum}+\dot{n}_{Leak\_Model})-1$ and $F\approx1I_A\cdot\int e\,dt+p_A\cdot e+a^{old}$, in which:
    $A_{geo}$ is an orifice area of the injector/ejector that is determinable at a calibration event;
    $\text{Coeff}_{DC}$ is an orifice discharge coefficient of the injector/ejector that is determinable at the calibration event;
    $a^{new}$ is an updated adaption term;
    $F_x$ is an injector/ejector flow adjustment factor output from the PIA controller;
    $\dot{n}_{Leak\_Model}$ is an anode leak rate calculated by $\dot{n}_{Leak\_Model}=\dot{n}_{injSp\_Model}-\dot{n}_{TrsntConsum}$;
    $I_A$ is an integral gain of the PIA controller;
    $p_A$ is a proportional gain of the PIA controller;
    e is an error of the PIA controller;
    $\int e\,dt$ is a time integral of the error e; and
    $a^{old}$ is a previous adaption term stored in a non-volatile memory associated with the control system.

8. The method of claim 7, further comprising: storing the updated adaption term $a^{new}$ in the non-volatile memory.

9. The method of claim 7, further comprising: replacing the previous adaption term $a^{old}$ stored in the non-volatile memory with the updated adaption term $a^{new}$.

10. The method of claim 7, wherein $\dot{n}_{Leak\_Model}$ is an averaged anode leak rate stored in the non-volatile memory.

11. A method of operating a fuel cell system having a hydrogen fuel injector/ejector, an anode, a proportional-integral-adaptive (PIA) controller operatively associated with the injector/ejector, a control system and a non-volatile memory associated with the control system, comprising:
    operating the fuel cell system at a power level for a predetermined time;
    determining a hydrogen fuel consumption rate $\dot{n}_{TrsntConsum}$ associated with the power level;
    obtaining a modeled hydrogen fuel flow rate $\dot{n}_{injSp\_Model}$ associated with the selected power level and the injector/ejector;
    finding an anode leak rate $\dot{n}_{Leak\_Model}$ of the anode, where $\dot{n}_{Leak\_Model}=\dot{n}_{injSp\_Model}-\dot{n}_{TrsntConsum}$; and
    calculating an adaption term $a^{new}$, where $a^{new}=(1+I_A\cdot\int e\,dt+p_A\cdot e+a^{old})\cdot\dot{n}_{TrsntConsum}/(\dot{n}_{TrsntConsum}+\dot{n}_{Leak\_Model})-1$, in which $I_A$ is an integral gain of the PIA controller, $p_A$ is a proportional gain of the PIA controller, e is an error of the PIA controller, $\int e\,dt$ is a time integral of the error e, and $a^{old}$ is a previously calculated or provided adaption term stored in the non-volatile memory.

12. The method of claim 11, further comprising:
    storing the calculated adaption term $a^{new}$ in the non-volatile memory.

13. The method of claim 11, further comprising:
    comparing the calculated adaption term $a^{new}$ with the previously calculated or provided adaption term $a^{old}$; and
    replacing the previously calculated or provided adaption term $a^{old}$ in the non-volatile memory with the calculated adaption term $a^{new}$ if the difference between the adaption terms $a^{old}$ and $a^{new}$ is greater than a predetermined value.

14. The method of claim 11, further comprising: storing the anode leak rate $\dot{n}_{Leak\_Model}$ in the non-volatile memory.

15. The method of claim 11, further comprising: repeating the operating, determining, obtaining, finding and calculating steps for a plurality of times for different power levels from the initial power level.

16. The method of claim 15, wherein in each repeat of the calculating step, the respective calculated adaption term $a^{new}$ is stored in the non-volatile memory as either (i) a replacement for a previously calculated adaption term or (ii) an average and/or accumulation of some or all of the previous adaption terms.

17. The method of claim 11, further comprising:
    estimating a true effective flow area $A_{Eff\_True}$ of the injector/ejector, using one of $A_{Eff\_True}=A_{Eff\_Model}\cdot(\dot{n}_{TrsntConsum}/\dot{n}_{injSp\_Model})$ and $A_{Eff\_True}=A_{geo}\cdot\text{Coeff}_{DC}\cdot(1+a^{new})$, in which $A_{Eff\_Model}$ is a modeled effective flow area associated with the injector/ejector, $A_{geo}$ is an orifice area of the injector/ejector and $\text{Coeff}_{DC}$ is an orifice discharge coefficient of the injector/ejector; and
    using the effective flow area $A_{Eff\_True}$ to calculate or adjust a command signal, an estimation or an estimation error of at least one of a hydrogen fuel flow rate, an anode leak rate and the anode exhaust valve flow rate.

18. The method of claim 11, wherein at the selected power level at steady state, an anode pressure is maintained at a constant pressure.

19. The method of claim 11, wherein each of the modeled hydrogen fuel flow rate $\dot{n}_{injSp\_Model}$ and the modeled effective flow area $A_{Eff\_Model}$ is obtained from a look-up table associated with the control system or is calculated by the control system.

20. A method of operating a fuel cell system having a hydrogen fuel injector/ejector, an anode, a proportional-integral-adaptive (PIA) controller operatively associated with the injector/ejector, a control system and a non-volatile memory associated with the control system, comprising:

operating the fuel cell system at a power level for a predetermined time;

determining a hydrogen fuel consumption rate $\dot{n}_{TrsntConsum}$ associated with the power level;

obtaining a modeled hydrogen fuel flow rate $\dot{n}_{injSp\_Model}$ associated with the selected power level and the injector/ejector;

finding an anode leak rate $\dot{n}_{Leak\_Model}$ of the anode, where $\dot{n}_{Leak\_Model} = \dot{n}_{injSp\_Model} - \dot{n}_{TrsntConsum}$;

calculating an adaption term $a^{new}$, where $a^{new} = (1+I_A \cdot \int e\, dt + p_A \cdot e + a^{old}) \cdot \dot{n}_{TrsntConsum}/(\dot{n}_{TrsntConsum} + \dot{n}_{Leak\_Model}) - 1$, in which $I_A$ is an integral gain of the PIA controller, $p_A$ is a proportional gain of the PIA controller, e is an error of the PIA controller, $\int e\, dt$ is a time integral of the error e, and $a^{old}$ is a previously calculated or provided adaption term stored in the non-volatile memory;

comparing the calculated adaption term $a^{new}$ with the previously calculated or provided adaption term $a^{old}$;

replacing the previously calculated or provided adaption term $a^{old}$ in the non-volatile memory with the calculated adaption term $a^{new}$ if the difference between the adaption terms $a^{old}$ and $a^{new}$ is greater than a predetermined value;

repeating the operating, determining, obtaining, finding, calculating, comparing and replacing steps for a plurality of times for different power levels from the initial power level;

estimating a true effective flow area $A_{Eff\_True}$ of the injector/ejector, using one of $A_{Eff\_True} = A_{Eff\_Model} \cdot (\dot{n}_{TrsntConsum}/\dot{n}_{injSp\_Model})$ and $A_{Eff\_True} = A_{geo} \cdot Coeff_{DC} \cdot (1+a^{new})$, in which $A_{Eff\_Model}$ is a modeled effective flow area associated with the injector/ejector, $A_{geo}$ is an orifice area of the injector/ejector and $Coeff_{DC}$ is an orifice discharge coefficient of the injector/ejector; and using the effective flow area $A_{Eff\_True}$ to calculate or adjust a command signal, an estimation or an estimation error of at least one of a hydrogen fuel flow rate, an anode leak rate and the anode exhaust valve flow rate.

\* \* \* \* \*